United States Patent
Nielsen

(10) Patent No.: US 9,419,439 B2
(45) Date of Patent: Aug. 16, 2016

(54) RECONNECTING A WIND POWER PLANT TO A UTILITY GRID

(71) Applicant: Kaj Skov Nielsen, Issaquah, WA (US)

(72) Inventor: Kaj Skov Nielsen, Issaquah, WA (US)

(73) Assignee: Siemens Aktiengesellschaft, Munich (DE)

( * ) Notice: Subject to any disclaimer, the term of this patent is extended or adjusted under 35 U.S.C. 154(b) by 403 days.

(21) Appl. No.: 14/155,003

(22) Filed: Jan. 14, 2014

(65) Prior Publication Data
US 2015/0200543 A1   Jul. 16, 2015

(51) Int. Cl.
| | |
|---|---|
| H02J 3/40 | (2006.01) |
| F03D 7/04 | (2006.01) |
| H02J 3/38 | (2006.01) |
| F03D 9/00 | (2016.01) |
| H02J 1/10 | (2006.01) |

(52) U.S. Cl.
CPC . *H02J 3/40* (2013.01); *F03D 7/048* (2013.01); *F03D 9/005* (2013.01); *H02J 3/386* (2013.01); *Y02E 10/723* (2013.01); *Y02E 10/763* (2013.01); *Y10T 307/735* (2015.04)

(58) Field of Classification Search
CPC .......................................................... H02J 1/10
USPC ............................................................. 307/85
See application file for complete search history.

(56) References Cited

U.S. PATENT DOCUMENTS

| | | |
|---|---|---|
| 2008/0284172 A1 | 11/2008 | Nielsen |
| 2012/0139344 A1 | 6/2012 | Langel |
| 2012/0261917 A1 | 10/2012 | Egedal et al. |

*Primary Examiner* — Robert Deberadinis
(74) *Attorney, Agent, or Firm* — Beusse Wolter Sanks & Maire

(57) ABSTRACT

It is described a method for coupling plural wind turbines to a utility grid after the wind turbines have been disconnected from the utility grid, the method comprising: closing a main breaker arranged between the utility grid and a main transformer resulting in reactive current flowing from the utility grid to the main transformer; closing a first feeder switch arranged between the main transformer and a first group of wind turbines of the plural wind turbines; selecting a first reference voltage; operating first converters of the first group of wind turbines in a voltage control mode according to the first reference voltage; and closing a second feeder switch.

20 Claims, 2 Drawing Sheets

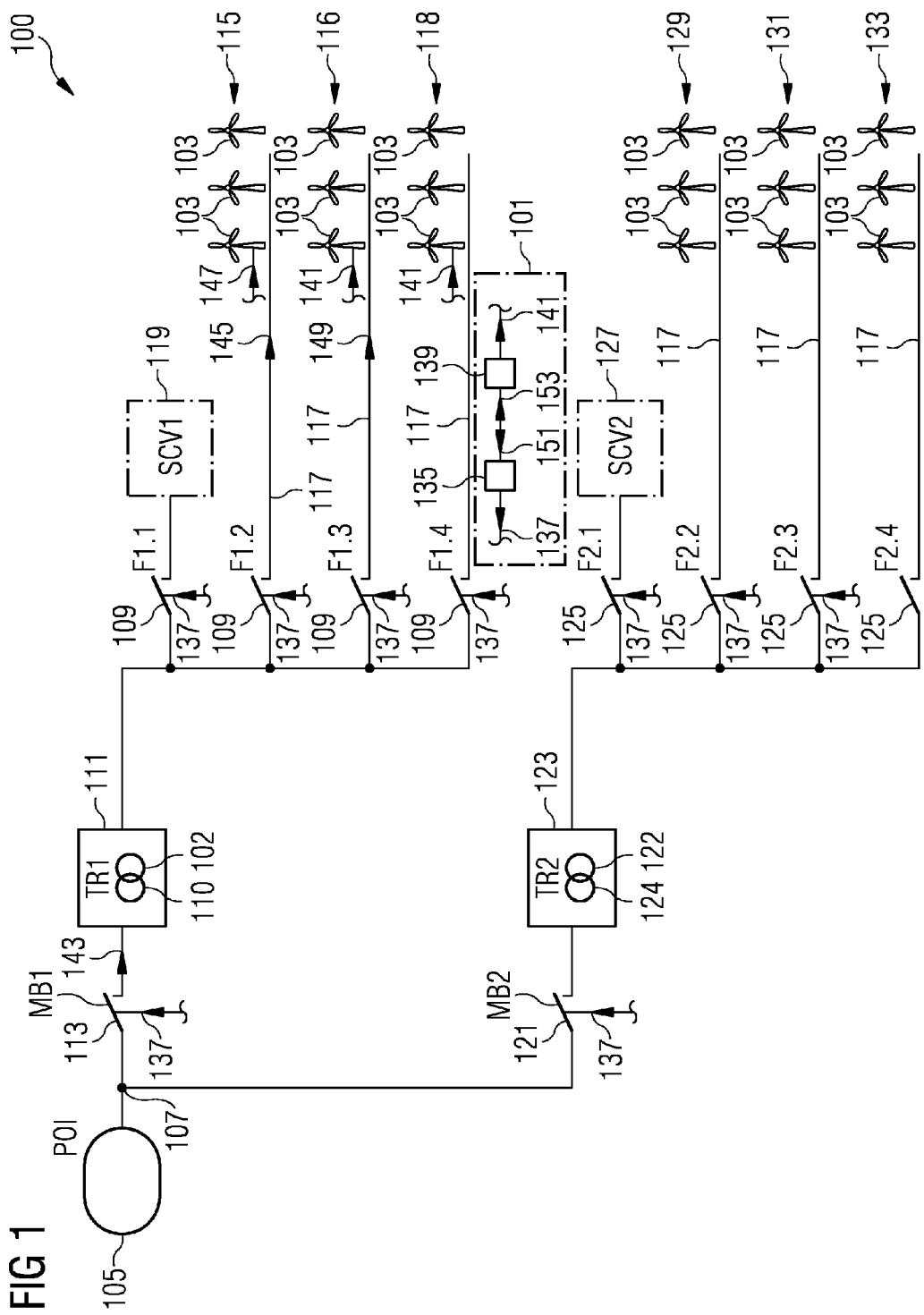

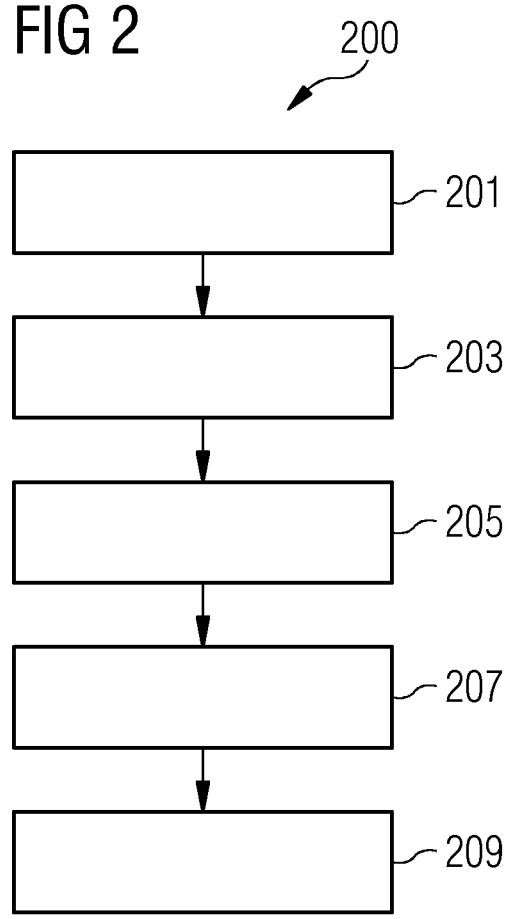

RECONNECTING A WIND POWER PLANT TO A UTILITY GRID

FIELD OF INVENTION

The present invention relates to a method and to a system for coupling plural wind turbines to a utility grid after the wind turbines have been disconnected from the utility grid, in particular in order to reduce an in-rush current and/or to stabilize a voltage of the utility grid and/or at a point of interconnection of the plural wind turbines.

ART BACKGROUND

Several reasons or failures or electrical conditions may lead to a requirement to disconnect a wind power plant comprising plural wind turbines from the utility grid to which under normal conditions electric energy is supplied from the wind power plant. The failure may have occurred outside the wind power plant and may involve electrical conditions at a point of interconnection (where the plural wind turbines are connected to the utility grid) which results in disconnection of the plural wind turbines from the utility grid. For example, lightning, phase to phase short, ground fault or other protection trip resulting in the wind power plant being disconnected. Other examples could be routine maintenance on the wind power plant infrastructure or electrical faults inside the wind power plant.

After the failure or fault has been remedied, the wind power plant including the plural wind turbines need to be reconnected to the utility grid. In a conventional procedure, when power to a large wind power plant is restored after a power outage, it has been observed that the inrush-current may be very large and may result in difficulty complying with grid interconnection requirements or increase the rating of some portion of the infrastructure resulting in higher installation cost.

There may be a need for a method and for a system of coupling (or reconnecting) plural wind turbines to a utility grid after the wind turbines have been disconnected from the utility grid, wherein a stability of the utility grid, in particular regarding nominal values of voltage, reactive power, frequency, flicker etc., may be improved, or reached with a cheaper infrastructure.

SUMMARY OF THE INVENTION

This need may be met by the subject matter according to the independent claims. Advantageous embodiments of the present invention are described by the dependent claims.

According to an embodiment of the present invention, it is provided a method for coupling plural wind turbines to a utility grid (or a point of interconnection) after the wind turbines have been disconnected from the utility grid, the method comprising: closing a main breaker arranged between the utility grid and a main transformer resulting in reactive current flowing from the utility grid to the main transformer, closing a first feeder switch arranged between the main transformer and a first group of wind turbines of the plural wind turbines resulting in reactive current flowing from the main transformer to first wind turbine transformers of the first group of wind turbines, waiting for the grid converter of the first subset of turbines to energize and activate voltage support selecting a first voltage reference based on an expected voltage drop that occurs when a second feeder switch arranged between the main transformer and a second group of wind turbines of the plural wind turbines is closed, operating first converters of the first group of wind turbines in a voltage control mode according to the first reference voltage, and (afterwards) closing the second feeder switch.

By applying a voltage reference slightly above the desired target voltage, the resulting voltage dip associated with the in-rush current triggered voltage drop may result in a smaller deviation from the desired target voltage compared to conventional methods. Similarly, if a feeder is to be switched in next, the optimal preceding voltage reference may be slightly below the desired voltage reference in order to reduce the impact of the resulting voltage overshoot from switching in a large capacitive load.

Connected wind turbines may be brought into operation with active voltage control prior to connecting the subsequent turbine breaker in order to have as many grid inverters support the voltage as possible before connecting additional transformers. Before connecting any additional turbine transformers, the optimal voltage references may be calculated and distributed to the already available turbine(s).

The coupling of the plural wind turbines to the utility grid may involve (re)connecting the plural wind turbines to the utility grid via at least one main breaker and/or at least one feeder switch. Thereby, the main breaker and any of the feeder switches may essentially comprise a power switch, in order to electrically connect (or disconnect) the main transformer to (or from) the utility grid or the main transformer to (or from) the respective group of wind turbines, respectively. The main breaker and any of the feeder switches may comprise mechanical and power electronic components and may be controlled (regarding closing/opening) via a control signal received from one or more controllers. In one embodiment the controls are based on a combination of direct control of devices and pre-determined local time delayed activation of devices. The utility grid may under normal conditions supply electric energy to a plurality of consumers. The utility grid may under normal operation and energization supply all the reactive in-rush power/in-rush current for all the transformers.

At least one of or a number of or all of the plural wind turbines may comprise a converter, in particular an AC-DC-AC converter which, under normal production conditions of the wind turbines, converts a variable frequency power (received from a generator of the wind turbine which is coupled to a rotor of the wind turbines) to a DC-voltage at a DC-link and the convert the DC-voltage to a fixed frequency electrical power having the frequency of the utility grid or a nominal utility grid frequency and having a voltage corresponding to a reference voltage signal supplied to the respective converter of the wind turbine. Thereby, the converters of the wind turbines may comprise power electronic components, in particular power transistors (such as IGBTs) which are controlled via gate driver circuitry that sends (pulse width modulation) gate control signals to the gates of the power transistors or power switches. In particular, each wind turbine converter may comprise a generator portion being a portion of the converter connected in between the generator of the wind turbine and the DC link and may further comprise a grid portion being connected between the DC link and the utility grid (via e.g. a wind turbine transformer and a main transformer which is connected to the point of interconnection and via transmission line(s)). Based on the received reference voltage signal, the grid converter controls its power switches such that at an output terminal of the converter (leading to the wind turbine transformer), the demanded voltage (AC voltage) having the demanded frequency is generated (regardless of whether the wind turbine produces active electric energy or not producing active electric energy).

The plural wind turbines may be comprised in a wind power plant, e.g. an offshore or onshore wind power plant. Between the first group of wind turbines and the first feeder switch, a transmission line may be arranged which carries the electrical power generated by the first group of wind turbines under normal conditions. In particular, an output voltage of each of the wind turbines at the output terminal of the respective converter (or behind the wind turbine transformer) may be between 600 V and 800 V, in particular around 690 V. Each wind turbine may comprise a wind turbine transformer which may transform the electrical power output by the respective wind turbine converter to electrical power having a voltage between 20 kV and 60 kV, in particular 32 kV. The wind power plant may comprise several main transformers which are connected (in parallel) to the utility grid (in particular via a point of interconnection) via several main breakers (each main transformer having an associated main breaker). At each of the main transformers, several groups of wind turbines may be connected to (under normal operation conditions) via plural respective feeder switches. The main transformers may transform to a voltage 100 kV to 240 kV, in particular around 130 kV.

Closing the main breaker (thereby connecting the utility grid and the main transformer electrically) may cause an in-rush current to flow from the grid into the transformer. In particular, a main portion of an inrush-current when the main breaker is closed may in the form of the reactive current (being a current which is 90° out of phase with the associated voltage). Afterwards, the first feeder switch is closed, thereby electrically connecting the (primary winding) of the main transformer and the first group of wind turbines. Thereby, the first group may in particular be that group of wind turbines which are arranged to be connected finally to the main transformer which comprises the smallest number of wind turbines or which results in the least disturbance of the utility grid, which in particular results in a smallest inrush-current into this first group of wind turbines, when the first feeder switch is closed. Thereby, a reactive inrush-current may flow from the primary winding of the main transformer into the respective secondary winding of the wind turbine transformers of the first group of wind turbines. Thereby, a voltage drop may be observed or occurring at the point of interconnection (to which the main transformer is connected). Thereby, the electrical intended or nominal characteristics of the utility grid may be temporarily disturbed.

However, in order to keep the disturbance or voltage drop as small as possible, simultaneously with or subsequent to the closing of the first feeder switch, the first converters (or at least one of them) of the first group of wind turbines are operated in the voltage control mode according to the first reference voltage. Thereby, the first reference voltage is (previously or simultaneously) selected such as to counteract an anticipated voltage drop which would occur when the second feeder switch is closed which would then electrically connect the main transformer and a second group of wind turbines (being different from the first group of wind turbines) of the plural wind turbines. Thereby, the first converters advantageously prepare for the (subsequent) connection of the second group of wind turbines to the main transformer, and in particular operate the first group of wind turbine converters such as to counteract (at least partially) an additional voltage drop occurring when the second group of wind turbines is connected to the main transformer. The in-rush current to subsequent transformers may be delivered primarily by the grid converters already active in addition to being delivered from the main transformer and the utility grid.

Furthermore, according to embodiments of the present invention, if several (parallel) main transformers are present, these may not be energized at the same time, i.e. they may or may not be connected to the utility grid at the same time. In particular, the several main transformers may be subsequently connected to the utility grid. Furthermore, between closing the first feeder switch and closing the second feeder switch, a predetermined delay time may have elapsed. Furthermore, even wind turbines within the first group of wind turbines may be started up or connected to the transmission line simultaneously, subsequently or partly simultaneously and partly subsequently, in particular subsequently having a predetermined time delay in between. Thereby, the order (via individual wind turbine connection switches) in which the wind turbines within the first group of wind turbines are connected (via the first feeder switch) to the main transformer may be determined based on an electrical impact the respective wind turbines have on the voltage at the point of interconnection. In particular, the individual turbines within the first group (or the second group or any group of wind turbines) may be started up or connected based on differentiated delay timers.

According to embodiments of the present invention, a substation control system or substation SCADA may manage the power up of the substation infrastructure including energizing the main breakers and feeder switches for the turbine string (each string connecting a respective group of turbines to the respective feeder). According to conventional approaches, the wind turbines may typically start up autonomously or may be enabled in a sequential manner in an uncoordinated manner in relation to the substation control system. Thereby, according to conventional approaches, turbines typically may respond to simply receiving power and then initiation the boot up process. The result of these conventional approaches may be that significant inrush-current events with different magnitudes occur which may lead to a voltage drop at the point of interconnection.

According to embodiments of the present invention, however, the controlling the main breaker and feeder switches and the control of the operation modes of the wind turbine is and the voltage references issued to each grid inverter is performed in a coordinated manner, in order to reduce the magnitude of the inrush-currents and thus reducing voltage drops observed at the point of interconnection. In particular, the magnitude of the inrush-current events after the first group (or string) of wind turbines is connected to the main transformer (via closing the first feeder switch) may be reduced by ensuring that the first string of turbines is fully energized and provides local voltage support. This means that reactive current needed after energization of subsequent transformers and/or feeders may be partially supplied by the turbines which are already booted up and operated in a particular control mode.

According to an embodiment of the present invention, the first converters are operated for a time period in order to stabilize a voltage at a point of interconnection between the utility grid and the main breaker.

After the time period has elapsed, oscillations may have dampened and the voltage at the point of interconnection may be at least approximately stable, thus in particular not deviating more than 1-10% from the nominal voltage.

When the second feeder switch is closed, an inrush-current may flow into the transformers of the second group of wind turbines which may lead to a voltage drop at the point of interconnection. However, since the first wind turbine converters are operated according to the first reference voltage, they effectively provide voltage support, in order to reduce the voltage drop.

According to an embodiment of the present invention, the first reference voltage is larger than a nominal reference voltage at the point of interconnection.

When the first reference voltage is larger than the nominal reference voltage at the point of interconnection, the first converters of the first group of wind turbines may effectively be operating in order to reduce the voltage drop when the second group of wind turbines is connected to the main transformer via closing the second feeder switch. Thereby, in particular, a very short time before closing the second feeder switch, the first converter may be operated according to the first reference voltage. The short time period may for example amount to between 0 s and 500 ms or between 0 s and 3 s. Before that time period (i.e. before the second feeder switch is closed and while only the first feeder switch is closed) the first wind turbine converter may be operated in a voltage control mode according to the nominal reference voltage at the point of interconnection. In particular, wind turbines comprised within the first group of wind turbines may in a stepwise manner (i.e. one by one) transition from being operated according to the nominal reference voltage to be operated according to the first reference voltage. In particular, this transition of the first wind turbine converters being operated according to the nominal reference voltage and then according to the first reference voltage may be synchronized or coordinated with connection of individual wind turbines of the first wind turbine group to the main transformer. Thereby, stability of the voltage at the point of interconnection may further be improved.

According to an embodiment of the present invention, the first reference voltage is the nominal reference voltage plus half of an expected voltage drop (e.g. determined using a physical model and computing) that occurs at the point of interconnection when the second feeder switch is closed.

Thereby, before closing the second feeder switch, the actual voltage at the point of interconnection may be higher than the nominal reference voltage and after closing the second feeder switch, the actual voltage at the point of interconnection may be lower than the nominal voltage, wherein the deviation from the nominal voltage may the same when the situation before and after closing the second feeder switch is compared. Thereby, the stability of the voltage at the point of common coupling may be improved.

According to an embodiment of the present invention, the first wind turbine converters supply reactive power to the second wind turbine transformers.

In particular, the first wind turbine converter (or converters of any other of the wind turbines) may essentially be operated similar as a dynamic VAR system, i.e. a system which may dynamically provide or consume reactive power. A dynamic VAR system (SVC) may essentially be similar to a grid portion of a wind turbine converter (potentially also including the DC link capacitor). Such a system may behave like a (controllable) capacitor. This reactive power support function may be exploited or used both in the case when the wind turbine is producing electric energy (i.e. when the rotor is rotating) or when the rotor stands still or is idle such that the wind turbine is not producing electrical energy.

According to an embodiment of the present invention, the coupling method further comprises closing a feeder switch between the main transformer and the a dynamic VAR controller before closing the first feeder switch, and operating the dynamic VAR controller according to a SVC reference voltage that is selected based on an expected voltage drop that occurs at the point of interconnection when the first feeder switch is closed. The dynamic VAR controller may be operated according to a constant voltage control mode according to a SVC reference voltage which is higher than the nominal reference voltage at the point of common coupling such as to be for example half the value above the nominal reference voltage from the expected voltage drop when the first group of wind turbines is connected (via the first feeder switch closing) to the main transformer.

Thereby, even during the initial event of connecting the first group of wind turbines to the main transformer, the voltage at the point of interconnection may be maintained close to the nominal reference voltage.

According to an embodiment of the present invention, the method further comprises selecting a second reference voltage based on an expected voltage drop that occurs when a third feeder switch arranged between the main transformer and a third group of wind turbines of the plural wind turbines is closed, operating second converters of the second group of wind turbines, and in particular also the first converters, in a voltage control mode according to second reference voltage, and closing the third feeder switch.

This scheme may be continued with further groups of wind turbines, in that wind turbines already connected to the main transformer (and optionally already operating to produce electric energy) may be effectively utilized to support the voltage to prepare that a further group of wind turbines is connected to the main transformer in a subsequent step.

According to an embodiment of the present invention, the method is repeated for any feeder switch, until all wind turbines intended to be connected to the main transformer are connected to the main transformer.

According to an embodiment of the present invention, the method further comprises operating all converters of all wind turbines connected to the main transformer according to the nominal reference voltage in voltage control mode.

In particular, after closing each feeder switch, the voltage at the point of interconnection may slightly drop. Then, the wind turbines which have just been connected to the main transformer may assume normal operation in that they produce energy when their respective rotors are rotating. After they adopt normal operation, the respective reference voltage may then be set to the nominal reference voltage, in order to actually achieve the nominal voltage at the point of interconnection.

This may in particular be performed, if the wind turbine comprises only one main transformer which has in a normal operation connected plural groups of wind turbines to it.

If however the wind turbine comprises several (or at least two) main transformers, the method may further comprise if wind power plant comprises a further main transformer intended to be connected with further groups of wind turbines: parallel or semi parallel or sequentially closing a further main breaker arranged between the utility grid and the further main transformer resulting in reactive current flowing from the utility grid to the further main transformer, operating all converters of wind turbines connected to the main transformer according to a further first reference voltage, different from the nominal reference voltage, in voltage control mode in order to minimize voltage drop when a further first group of wind turbines is connected to the further main transformer by closing a further first feeder switch.

Thus, also in the case of a wind power plant comprising several main transformers (each having a plurality of groups connected to it in normal conditions or under normal operation conditions), the connection of a next main transformer is anticipated by first appropriately setting the further first reference voltage and providing this further first reference voltage to the converters of wind turbines connected to the main transformer, in order to effectively support the voltage.

According to an embodiment of the present invention, the method involves, for coordinating the method, communication between at least a first controller and a second controller, the first controller controlling the feeder switches and/or the main breakers, the second controller controlling the wind turbine converters by sending them reference voltages.

In particular, as soon as a control signal indicating the first reference voltage has been sent to the first converters and after it has been ensured that the first converters operate in the voltage control mode according to the first reference voltage, a communication signal may be sent from the second controller to the first controller to indicate to (immediately or after a predetermined time interval) close the second feeder switch. Thereby, a time interval during which the first converters are operated according to the first reference voltage and closing the second feeder switch may be minimized. According to other embodiments of the present invention, the method is performed by a single controller or by a single component comprised in a large controller, such as a park pilot.

According to an embodiment of the present invention, the second controller sends a message to the first controller indicating that a next feeder switch and/or a next breaker should be closed after having provided wind turbines with selected reference voltages.

According to an embodiment of the present invention, the first controller or the second controller is a master controller and the other controller is a slave controller.

Thereby, conventionally available communication protocols or coordination between several controllers may be applied and/or coordination may be simplified.

According to an embodiment of the present invention, the first controller and the second controller operate according to a pre-agreed sequence and/or timing and/or delays of method steps. In particular, there may be pre-agreed time intervals or delays between operating converters according to a particular reference voltage and closing a feeder switch for connecting further wind turbines to the main transformer.

According to an embodiment of the present invention, the second controller determines reference voltages for the wind turbines so that inrush-current from the utility grid is less than a threshold. If the inrush-current is less than a threshold, a voltage drop may be limited.

According to an embodiment of the present invention, the method may be performed for starting up after power outage to reduce inrush-current.

According to an embodiment of the present invention, the first wind turbines comprise five to 20 wind turbines, wherein the first wind turbines are connected via separate switches to the first feeder switch sequentially.

The order in which the first wind turbines are connected (to the main transformer) may be selected in a decreasing order of electrical influences of the respective first wind turbines. The dynamic VAR system may additionally support the voltage at the point of interconnection.

It should be understood that features individually or in any combination disclosed, provided, described or employed for a method for controlling coupling plural wind turbines to a utility grid may also be individually or in any combination applied, provided for or employed for a system for controlling coupling plural wind turbines to a utility grid according to an embodiment of the present invention and vice versa.

According to an embodiment of the present invention, it is provided a system for controlling coupling plural wind turbines to a utility grid (point of interconnection) after the wind turbines have been disconnected from the utility grid, the system comprising at least one controller adapted to control a main breaker arranged between the utility grid and a main transformer to close resulting in reactive current flowing from the utility grid to the main transformer, to control a first feeder switch arranged between the main transformer and a first group of wind turbines of the plural wind turbines to close resulting in reactive current flowing from the main transformer flowing to first wind turbine transformers of the first group of wind turbines, to select a first reference voltage based on an expected voltage drop that occurs when a second feeder switch arranged between the main transformer and a second group of wind turbines of the plural wind turbines is closed, to send a control signal to first converters of the first group of wind turbines to operate the first converters in a voltage control mode according to the first reference voltage, and to control the second feeder switch to close.

According to an embodiment of the present invention, the at least one controller comprises a first controller controlling the feeder switches and breakers and a second controller controlling the wind turbine converters.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 schematically illustrates a wind power plant including a system for controlling coupling plural wind turbines to a utility grid according to an embodiment of the present invention carrying out a method for controlling coupling plural wind turbines to the utility grid according to an embodiment of the present invention; and FIG. 2 illustrates method steps of a method for controlling coupling plural wind turbines to a utility grid according to an embodiment of the present invention.

DETAILED DESCRIPTION

The illustration in the drawings is in schematic form.

The wind power plant 100 illustrated in FIG. 1 comprises a system 101 for controlling coupling plural wind turbines 103 to a utility grid 105 according to an embodiment of the present invention. The utility grid 105 is connected to a point of interconnection 107 to which the plural wind turbines 103 are connected via first feeder switches 109 (F1.2, F1.3, F1.4), a main transformer 111 and a main breaker 113 (MB1). In particular, a first group of wind turbines 115 is connected via a transmission line 117 to a first feeder switch F1.2 which is connected to the main transformer 111, in particular to a primary winding 112 of the main transformer 111 which is inductively coupled to a secondary winding 110 of the main transformer 111. A first wind turbine group 115 is connected to the first feeder switch F1.2, a second wind turbine group 116 is connected to a second feeder switch F1.3 and a third wind turbine group 118 is connected to a third feeder switch F1.4. Via a feeder switch F1.1, a dynamic VAR system 119 is also connected to the main transformer 111.

The wind power plant 100 illustrated in FIG. 1 further comprises a further main breaker 121 which is connected to the point of interconnection 107, wherein the further main breaker 121 (MB2) connects the point of interconnection 107 to a further main transformer 123 having a primary winding 122 and having a secondary winding 124 which are inductively coupled with each other. To the further main transformer 123, further feeder switches 125 (F2.1, F2.2, F2.3, F2.4) are connected which either are connected to a further dynamic VAR system 127 or to further wind turbines 103. In particular, a further first wind turbine group 129 is connected to the further first feeder switch F2.2, a further second wind turbine group 131 is connected to a further second feeder switch F2.3 and a further third wind turbine group 133 is connected to a further third feeder switch F2.4.

The system 101 for controlling the coupling of the plural wind turbines 103 to the utility grid 105 comprises a first controller 135 which, via a control signal 137, controls the feeder switches 109, 125 and the main breaker 113 and the further main breaker 121. Thereby, the control signal 137 may comprise individual control signals to all individual feeder switches 109, 125 and individual control signals to the main breakers 113, 121. The first controller 135 generates the control signal 137 or the plural control signals 137 to control opening and closing the feeders 109, 125 as well as the breakers 113, 121.

The system 101 further comprises a second controller 139 which, via a control signal (or a plurality of control signals) 141, controls the wind turbines 103, in particular the first wind turbine group 115, the second wind turbine group 116, the third wind turbine 118, the further first wind turbine group 129, the further second wind turbine group 131 and the further third wind turbine group 133. In particular, the control signal 141 may comprise plural individual control signals for the individual wind turbines 103. In particular, the control signal or control signals 141 may be supplied to a respective (not illustrated) wind turbine converter comprised in each of the illustrated wind turbines 103. In particular, the control signal 141 may comprise a signal indicating a reference voltage to be used by the respective wind turbine converters in order to control power switches within the wind turbine converter.

A method for controlling to couple plural wind turbines to a utility grid according to an embodiment of the present invention will be now explained with reference to FIG. 2. The method 200 of which method steps are illustrated in FIG. 2 comprises closing 201 a main breaker 113 (MB1) arranged between the utility grid 105 and a main transformer 111 resulting in reactive current 143 flowing from the utility grid 105 to the main transformer 111. Further, the method 200 comprises closing 203 a first feeder switch F1.2 arranged between the main transformer 111 and a first group 115 of wind turbines 103 resulting in a reactive current 145 flowing from the main transformer 111 to not illustrated first wind turbine transformers of the first group 115 of wind turbines. The method 200 further comprises selecting 205 a first reference voltage 147 based on an expected voltage drop that occurs when a second feeder F1.3 arranged between the main transformer 111 and a second group 116 of wind turbines of the plural wind turbines is closed via the control signal 137 generated by the first controller 135. The method 200 further comprises operating 207 first converters (not illustrated in FIG. 1) of the first group 115 of wind turbines in a voltage control mode according to the first reference voltage 147 which is derived from the control signal 141 sent from the second controller 139 to the first group 115 of wind turbines 103. The method 200 further comprises closing 209 the second feeder switch F1.3 resulting in a reactive inrush-current 149 flowing into not illustrated transformers of the wind turbines 103 of the second group 116 of wind turbines.

According to embodiments of the present invention, a new level of integration of the two control systems for controlling on one hand the feeders 109, 125 and main breakers 113, 121 and controlling on the other hand the wind turbines 103, in particular their converters. In that way, the energization of the substation infrastructure and the energization of the wind turbines 103 are no longer executed sequentially but in a coordinated manner.

The control method of FIG. 2 could be implemented as direct control and reference distribution, or as independent controls with pre-coordinated timing sequences or some combination of direct control or pre-agreed time schedule execution commands.

According to an embodiment of the present invention, the coupling method may involve or comprise the following steps (from which however also one or more steps may be omitted):

1. Energize the main transformer 111 with the least inrush-current, thus, from the main transformer comprised within the wind power plant that main transformer is selected which would result in the least inrush-current when the respective breaker is closed.

2. Energize the feeder 109 with the smallest number of wind turbines or the least expected inrush-current on the transformer above.

3. Energize one or more turbines on the first energized feeder.

4. Bring the first group of turbines (115) online in voltage control mode (only regulation of reactive power no or limited active power in order to provide optimal reactive current capability)

5. Select the optimal voltage reference offset for energization of the next string feeder (i.e. anticipate a voltage drop when a next feeder, e.g. the second feeder F1.3 is closed). According to an embodiment of the present invention, this may mean a reference that differs from the issued nominal voltage reference by a small amount. In one embodiment, if a voltage dip of 0.2% is expected (when closing the next string feeder), the pre-energization voltage reference may be set to V_ref (nominal voltage reference) plus 0.1% minimizing the maximal deviation from the utility issued reference during the inrush-current event).

6. For each subsequent feeder (e.g. feeder F1.4), a dedicated reference offset may be applied with enough time to reach steady state prior to the feeder closing.

7. When the last feeder is closed, the reference offset shall no longer be applied (in particular all wind turbine converters should be supplied with the nominal voltage reference).

8. If there are multiple substation transformers (for example the further transformer 123 illustrated in FIG. 1), the above steps 1-7 may be repeated for each transformer. Multiple transformers may be executing this process in parallel or semiparallel or sequentially depending on how the best compromise between energization speed and energization impact can be reached.

9. Substations that contain SVC systems may close the feeder for such SVC systems as a step between steps 1 and 2.

Then making sure that the SVC is functioning and has applied a feeder-specific voltage offset prior to closing the feeder for the first turbine string.

According to embodiments of the present invention, the above or in the summary section mentioned methods for executing the desired sequence may be implemented in multiple ways. It could be a series of handshakes between the two controllers (for example controllers 135 and 139) which may exchange messages 151 and 153. It could also be that one controller executes as the master and the other controller just transmits the commands on or it executes more or less autonomously based on pre-agreed timings for each step and delays before next step, etc.

The implementation of high voltage DC transmission line between several components such as between the point of interconnection 107 and the main transformers 111, 123 or between the main transformers 111, 113 and the wind turbines 103 may reduce the impact of very long power lines and very large transformers. Additional SVC close to the interconnection points 107 may integrate the impact of energization inrush-current.

According to embodiments of the present invention, the control layout may consist of one or more controllers and in one embodiment two controllers one for the turbines and one for the substation breakers and feeders are employed, wherein these two controllers interface with each other in order to synchronize the execution of the above-described steps.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. Method for coupling plural wind turbines to a utility grid after the wind turbines have been disconnected from the utility grid, the method comprising:
    closing a main breaker arranged between the utility grid and a main transformer resulting in reactive current flowing from the utility grid to the main transformer;
    closing a first feeder switch arranged between the main transformer and a first group of wind turbines of the plural wind turbines resulting in reactive current flowing from the main transformer to first wind turbine transformers of the first group of wind turbines;
    selecting a first reference voltage based on an expected voltage drop that occurs when a second feeder switch arranged between the main transformer and a second group of wind turbines of the plural wind turbines is closed, the first group comprising a smaller number of wind turbines than the second group of wind turbines;
    operating first converters of the first group of wind turbines in a voltage control mode according to the first reference voltage; and
    closing the second feeder switch.

2. Method according to claim 1, wherein the first converters are operated for a time period in order to stabilize a voltage at a point of interconnection between the utility grid and the main breaker.

3. Method according to claim 2, wherein the first reference voltage is larger than a nominal reference voltage at the point of interconnection.

4. Method according to claim 3, wherein the first reference voltage is the nominal reference voltage plus half of an expected voltage drop that occurs at the point of interconnection when the second feeder switch is closed.

5. Method according to claim 1, wherein the first wind turbine converters supply reactive power to the second wind turbine transformers.

6. Method according to claim 1, further comprising:
    closing a feeder switch between the main transformer and the a dynamic VAR controller before closing the first feeder switch; and
    operating the dynamic VAR controller according to a SVC reference voltage that is selected based on an expected voltage drop that occurs at the point of interconnection when the first feeder switch is closed.

7. Method according to claim 1, further comprising:
    selecting a second reference voltage based on an expected voltage drop that occurs when a third feeder switch arranged between the main transformer and a third group of wind turbines of the plural wind turbines is closed;
    operating second converters of the second group of wind turbines, and in particular also the first converters, in a voltage control mode according to second reference voltage; and
    closing the third feeder switch.

8. Method according to claim 7, repeated for any feeder switch, until all wind turbines intended to be connected to the main transformer are connected to the main transformer.

9. Method according to claim 8, further comprising:
    operating all converters of all wind turbines connected to the main transformer according to the nominal reference voltage in voltage control mode.

10. Method according to claim 8, further comprising, if wind power plant comprises a further main transformer intended to be connected with further groups of wind turbines:
    parallel or semi parallel or sequentially closing a further main breaker arranged between the utility grid and the further main transformer resulting in reactive current flowing from the utility grid to the further main transformer;
    operating all converters of wind turbines connected to the main transformer according to a further first reference voltage, different from the nominal reference voltage, in voltage control mode in order to minimize voltage drop when a further first group of wind turbines is connected to the further main transformer by closing a further first feeder switch.

11. Method according to claim 1, which involves, for coordinating the method, communication between at least a first controller and a second controller, the first controller controlling the feeder switches and the main breakers, the second controller controlling the wind turbine converters by sending them one of reference voltages and reference reactive power.

12. Method according to claim 11, wherein the second controller sends a message to the first controller indicating that a next feeder switch and/or a next breaker should be closed after having provided wind turbines with selected reference voltages.

13. Method according to claim 11, wherein the first controller or the second controller is a master controller and the other controller is a slave controller.

14. Method according to claim 11, wherein the first controller and the second controller operate according to a pre-agreed sequence and/or timing and/or delays of method steps.

15. Method according to claim 11, wherein the second controller determines reference voltages for the wind turbines so that inrush current from the utility grid is less than a threshold.

16. Method according to claim 1, performed for starting up after power outage to reduce inrush-current.

17. Method according to claim 1, wherein the first wind turbines comprise five to 20 wind turbines, wherein the first wind turbines are connected via separate switches to the first feeder switch sequentially.

18. Method according to claim 1, wherein at least one additional dynamic VAR system is connected to the point of interconnection and operated to stabilize voltage at the point of interconnection.

19. System for controlling coupling plural wind turbines to a utility grid (point of interconnection) after the wind turbines have been disconnected from the utility grid, the system comprising at least one controller adapted to control a main breaker arranged between the utility grid and a main transformer to close resulting in reactive current flowing from the utility grid to the main transformer;

control a first feeder switch arranged between the main transformer and a first group of wind turbines of the plural wind turbines to close resulting in reactive current flowing from the main transformer flowing to first wind turbine transformers of the first group of wind turbines;

select a first reference voltage based on an expected voltage drop that occurs when a second feeder switch arranged between the main transformer and a second group of wind turbines of the plural wind turbines is closed;

send a control signal to first converters of the first group of wind turbines to operate the first converters in a voltage control mode according to the first reference voltage; and control the second feeder switch to close.

20. System according to claim 19, wherein the at least one controller comprises a first controller controlling the feeder switches and breakers and a second controller controlling the wind turbine converters.

\* \* \* \* \*